(12) United States Patent
Hayashi

(10) Patent No.: US 7,641,388 B2
(45) Date of Patent: Jan. 5, 2010

(54) TEMPERATURE SENSOR AND METHOD OF MANUFACTURING THE SAME

(75) Inventor: Kyutaro Hayashi, Takahama (JP)

(73) Assignee: DENSO CORPORATION, Kariya (JP)

( * ) Notice: Subject to any disclaimer, the term of this patent is extended or adjusted under 35 U.S.C. 154(b) by 286 days.

(21) Appl. No.: 11/730,744

(22) Filed: Apr. 3, 2007

(65) Prior Publication Data

US 2007/0237205 A1      Oct. 11, 2007

(30) Foreign Application Priority Data

Apr. 5, 2006   (JP) .............................. 2006-104611

(51) Int. Cl.
*G01K 13/00*   (2006.01)

(52) U.S. Cl. ..................................... 374/148

(58) Field of Classification Search .................. 73/717; 374/143, 148, 163, 208
See application file for complete search history.

(56) References Cited

U.S. PATENT DOCUMENTS

| 3,913,058 | A | | 10/1975 | Nishio et al. |
| 5,222,811 | A | * | 6/1993 | Miyoshi ...................... 374/208 |
| 6,003,379 | A | * | 12/1999 | Ichikawa et al. .............. 73/708 |
| 6,141,020 | A | * | 10/2000 | Larson ........................ 345/501 |
| 6,439,056 | B1 | * | 8/2002 | Jonsson ........................ 73/708 |
| 6,698,922 | B2 | * | 3/2004 | Adachi et al. ................ 374/208 |
| 6,860,635 | B2 | | 3/2005 | Muziol et al. |
| 7,043,993 | B2 | | 5/2006 | Hayashi et al. |
| 2004/0134282 | A1 | * | 7/2004 | Hayashi et al. ............... 73/708 |
| 2004/0182163 | A1 | * | 9/2004 | Yamashita et al. ............ 73/708 |

FOREIGN PATENT DOCUMENTS

| DE | 4 237 038 C2 | 5/1994 |
| GB | 2 207 509 A | 2/1989 |
| JP | A-62-66603 | 3/1987 |
| JP | U-62-167128 | 10/1987 |

OTHER PUBLICATIONS

Office Action dated Apr. 10, 2008 in corresponding German Patent Application No. 10 2007 015 196-0 (and English translation).

* cited by examiner

*Primary Examiner*—Andre J Allen
(74) *Attorney, Agent, or Firm*—Posz Law Group, PLC

(57) ABSTRACT

A temperature sensor includes a temperature sensor element, a housing and a supporting member. The temperature sensor element detects a temperature of media. The housing accommodates a terminal electrically connected to an outside circuit. The terminal is connected to the temperature sensor element through a lead having a strength insufficient for supporting the temperature sensor element. The supporting member accommodates the lead. The supporting member is made of a hot-melt adhesive, and connected to a part of the housing.

10 Claims, 5 Drawing Sheets

TEMPERATURE SENSOR AND METHOD OF MANUFACTURING THE SAME

CROSS REFERENCE TO RELATED APPLICATION

This application is based on Japanese Patent Application No. 2006-104611 filed on Apr. 5, 2006, the disclosure of which is incorporated herein by reference in its entirety.

BACKGROUND OF THE INVENTION

1. Field of the Invention

The present invention relates to a temperature sensor and a method of manufacturing the temperature sensor.

2. Description of Related Art

U.S. Pat. No. 7,043,993 (corresponding to JP-A-2004-198394) discloses a temperature sensor. The temperature sensor includes a housing and a temperature sensor element. The temperature sensor element is electrically connected to a terminal through a lead. The temperature sensor further includes a buffering member between the lead and the housing.

When the temperature sensor is used for controlling an engine, response performance of the temperature sensor is required to be fast. In order to make the response performance of the temperature sensor to be fast, the lead is made thinner, for example. However, when the lead is made thinner and longer, the temperature sensor element may not solidly be supported by the lead, because the lead may be bent or broken by vibration applied from outside. Further, when the lead is made to be fitted to the housing, the lead may be bent or broken.

SUMMARY OF THE INVENTION

In view of the foregoing and other problems, it is an object of the present invention to provide a temperature sensor and a method of manufacturing the temperature sensor.

According to a first example of the present invention, a temperature sensor includes a temperature sensor element, a housing and a supporting member. The temperature sensor element detects a temperature of media. The housing accommodates a terminal electrically connected to an outside circuit. The terminal is connected to the temperature sensor element through a lead having a strength insufficient for supporting the temperature sensor element. The supporting member accommodates the lead. The supporting member is made of a hot-melt adhesive, and connected to a part of the housing.

According to a second example, a method of manufacturing a temperature sensor includes an arranging step and an injecting step. In the arranging step, a lead inserted into a tube is arranged on a mold. The lead electrically connects a temperature sensor element and a terminal, which is electrically connected to an outside circuit. In the injecting step, a hot-melt adhesive is injected into the mold so as to form a supporting member for covering the lead inserted into the tube, and supporting the temperature sensor element.

Accordingly, response performance of the temperature sensor can be better, and the temperature sensor element can be solidly supported in the temperature sensor.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

Figure 1:
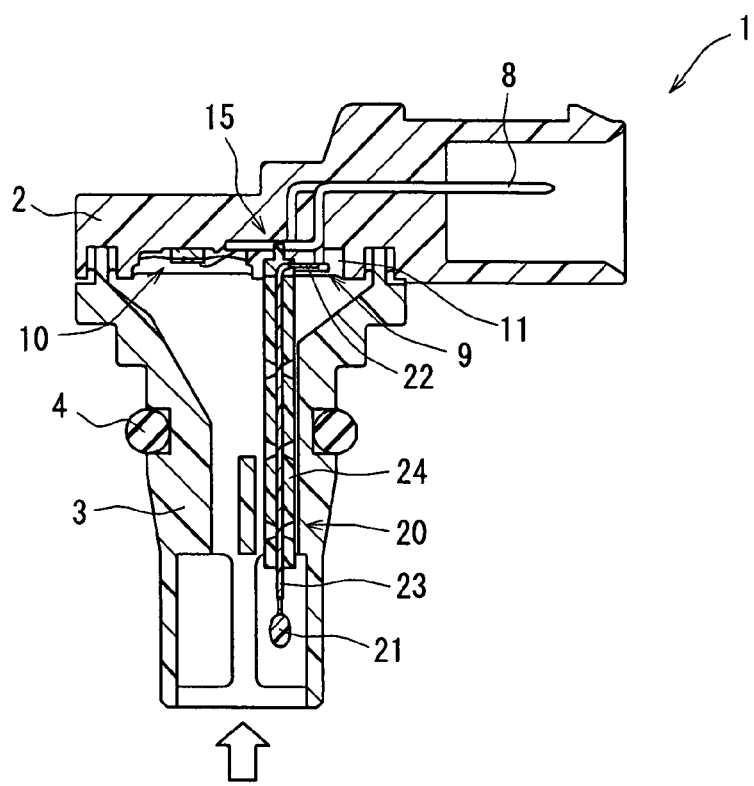
FIG. 1 is a cross-sectional view showing a pressure sensor device including a temperature sensor according to an embodiment of the present invention.

As shown in FIG. 1, a temperature sensor 20 is used in a temperature sensor integral-type pressure sensor device 1 for measuring a pressure and temperature of intake air in an intake manifold of a vehicle engine. The pressure sensor device 1 includes a pressure sensor 10 and the temperature sensor 20 in a housing constructed with a case 2 (first member) and a pipe 3 (second member). The case 2 and the pipe 3 are connected to each other.

The pressure sensor 10 includes a pressure sensor element for detecting pressure, and a signal processor integrated circuit (IC) for amplifying a signal output from the pressure sensor element. The pressure sensor 10 is supported by the case 2.

The case 2 is made of a heat resistant resin such as polybutylene terephthalate (PBT) or poly-phenylene sulfide (PPS). A terminal 8 is inserted into the case 2, and electrically connects the pressure sensor 10 and the temperature sensor 20 to an outside circuit such as an engine electric control unit (ECU).

The terminal 8 is electrically connected to a lead 22 in a connector 9. The connector 9 has a potting of a sealing agent 11 in a state that the terminal 8 and the lead 22 are electrically connected to each other.

The pipe 3 is made of a heat resistant resin such as PBT or PPS. The pipe 3 has a port 31 protruding to be connected to a detection port (not shown) provided in an air intake duct (not shown), for example. Media (fluid) to be detected passes through the port 31. The pipe 3 has a pressure introduction passage, through which the pressure sensor 10 and the port 31 communicate with each other. The pressure introduction passage is separated into a first passage and a second passage by a separation board 31 of the pipe 3. The separation board 3a of the pipe 3 extends in a direction of introducing media, for example. Media passes through the first passage toward a pressure-receiving face of the pressure sensor 10. The temperature sensor 20 is disposed in the second passage.

An O-ring 4 is disposed on a periphery of the pipe 3. The pipe 3 is airtightly fitted to a sensor-mounting portion (not shown) through the O-ring 4. The first and second passages are integrated in the pipe 3, and communicate with the pressure sensor 10. The separation board 3a is integrally formed with the pipe 3.

Figure 2A:
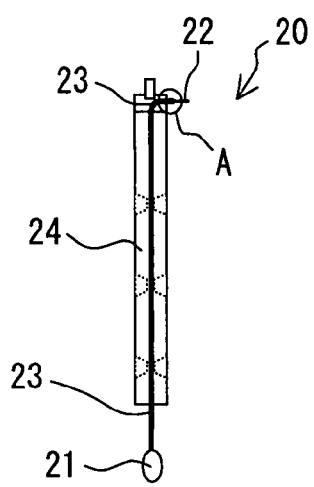
FIG. 2A is a schematic cross-sectional view showing the temperature sensor.

As shown in FIGS. 1 and 2A, the temperature sensor 20 includes a temperature sensor element 21, the lead 22, a protective (insulation) tube 23 and a supporting member 24. The lead 22 electrically connects the temperature sensor element 21 and the terminal 8 (outside circuit). When the lead 22 is made thin, response performance of the temperature sensor 20 can be improved.

Figure 2C:
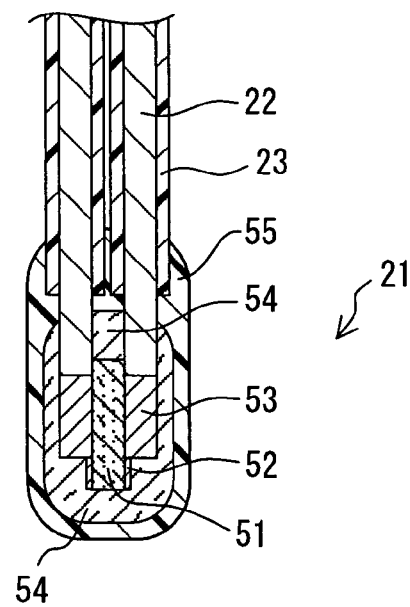
FIG. 2C is a cross-sectional view showing a temperature sensor element of the temperature sensor.
Figure 3A:
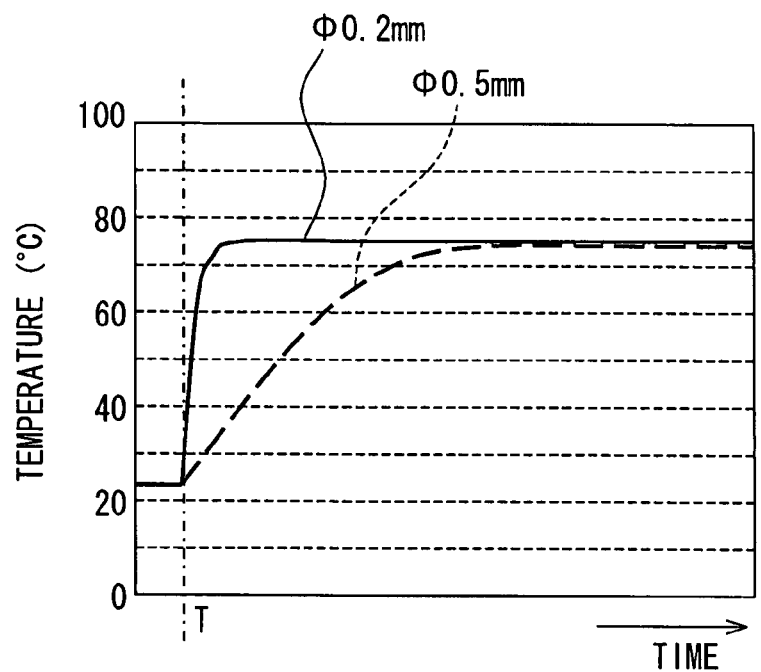
FIG. 3A is a graph showing response performance of the temperature sensor.
Figure 3B:
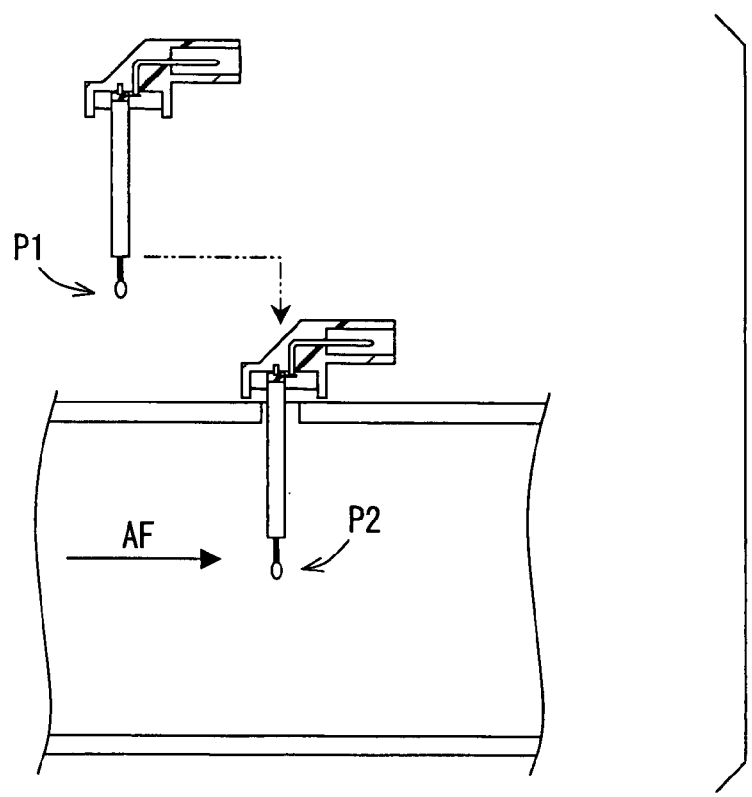
FIG. 3B is a diagram showing experiments in which the temperature sensor element is transferred from a first position to a second position.

Here, experiments are performed, as shown in FIG. 3B. The temperature sensor element 21 (a thermistor 51 in FIG. 2C) of the temperature sensor 20 is at a first position P1 in stationary air having temperature of 25° C. Then, the temperature sensor element 21 is transferred to a second position P2 as shown of a chained arrow direction in FIG. 3B. The second position P2 is located in air flow AF having temperature of 75° C. and flowing as shown of a solid-line arrow direction in FIG. 3B. FIG. 3A shows a relationship between a time and a temperature of the thermistor 51. A timing T in FIG. 3A indicates timing for transferring the temperature sensor element 21 from the first position P1 to the second position P2. As shown in FIG. 3A, a lead having diameter of 0.2 mm ($\phi$0.2 mm) has a better response performance, compared with a lead having diameter of 0.5 mm ($\phi$0.5 mm). Thus, when the lead 22 is made thin, that is when the lead 22 has a small diameter, the response performance of the temperature sensor 20 can be better.

However, if the lead having diameter of 0.2 mm is used as the lead 22, the lead 22 may be broken or bent when vibration is applied to the lead 22 or when the lead 22 is fitted to the housing. Therefore, the lead 22 cannot sufficiently support the temperature sensor element 21.

Here, the temperature sensor 20 includes the supporting member 24. The supporting member 24 sufficiently supports the temperature sensor element 21, while the lead 22 has a strength insufficient for supporting the temperature sensor element 21. Thus, the response performance of the temperature sensor 20 can be made better, and the temperature sensor element 21 can be solidly supported by the supporting member 24. The supporting member 24 is made of a hot-melt adhesive, e.g., polyurethane, polyester or polyamide. The supporting member 24 covers the lead 22 from adjacency of the connector 9 to adjacency of the temperature sensor element 21. The supporting member 24 and the case 2 are connected through a connection part 15. A protrusion of the supporting member 24 and a recess of the case 2 are engaged with each other in the connection part 15. Alternatively, a recess of the supporting member 24 and a protrusion of the case 2 may be engaged with each other in the connection part 15.

The supporting member 24 is mechanically connected to at least one of the case 2 and the pipe 3. At this time, when the supporting member 24 is connected to the case 2, the lead 22 is fixed to the case 2 through the supporting member 24. Similarly, when the supporting member 24 is connected to the pipe 3, the lead 22 is fixed to the pipe 3 through the supporting member 24. Thus, the supporting member 24 supports the temperature sensor element 21.

Figure 2B:
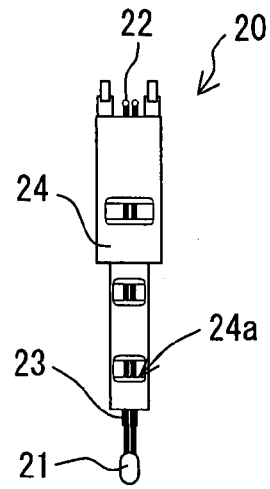
FIG. 2B is a schematic side view showing the temperature sensor.
Figure 2D:
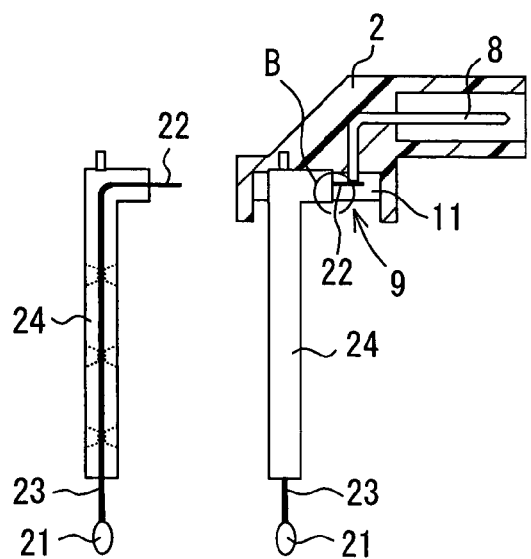
FIG. 2D is a schematic cross-sectional view showing an upper end of a supporting member of the temperature sensor.
Figure 2E:
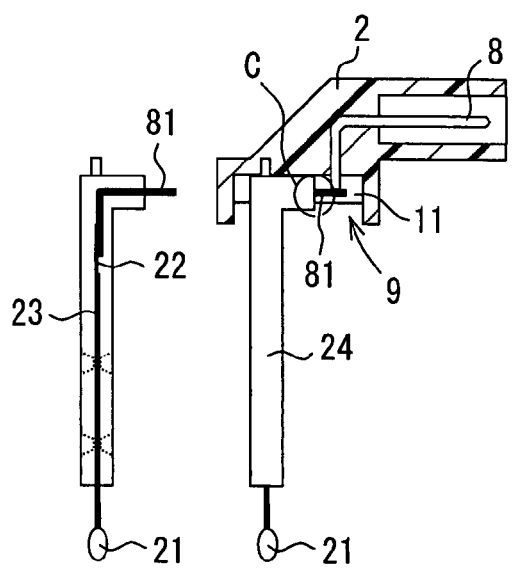
FIG. 2E is a schematic cross-sectional view showing another upper end of the supporting member of the temperature sensor.

A dashed line part of the supporting member 24 in FIGS. 2A, 2D and 2E represents a cavity 24a (clearance) of the supporting member 24 in FIGS. 2B and 5A-5C. FIG. 2B is a schematic side view of the temperature sensor 20 of FIG. 2A seen from a right side. As shown in FIGS. 2D and 2E, the supporting member 24 has a protrusion at its upper end, and the protrusion of the supporting member 24 is mechanically connected to the case 2, for example. The dashed line part is a trace made by a positioning jig 122 shown in FIG. 4, when the positioning jig 122 holds the lead 22 (tube 23) in a hot-melt adhesive injection process to be described below. The cavity 24a is not filled with the hot-melt adhesive. Therefore, the lead 22 covered with the tube 23 is exposed from the supporting member 24 only at the cavity 24a. The supporting member 24 has the cavity 24a such that the lead 22 is arranged at a predetermined position of the supporting member 24. The supporting member 24 may have plural cavities 24a.

The lead 22 is inserted into the tube 23 in order to reduce corrosion. As shown of a circle A in FIG. 2A, upper ends of the lead 22 and the tube 23 are exposed from the supporting member 24 so that the lead 22 is electrically connected to the terminal 8. Therefore, when the potting of the sealing agent 11 is performed in the connector 9, bubbles may be generated from a gap between the lead 22 and the tube 23. A vacuum injection of the sealing agent 11 may be performed, in order to reduce the bubbles. However, the vacuum injection may not efficiently be performed.

Therefore, as shown of a circle B in FIG. 2D, the tube 23 is not exposed at the upper end of the supporting member 24 adjacent to the connector 9. When the tube 23 is disposed completely inside of the supporting member 24, the vacuum injection of the sealing agent 11 is not needed. Thus, the bubbles in the sealing agent 11 can be reduced.

Further, as shown of a circle C in FIG. 2E, a terminal 81 may be provided in the supporting member 24. An end of the terminal 81 is electrically connected to the lead 22 inside of the supporting member 24, and another end of the terminal 81 is exposed from the supporting member 24 so as to be connected to the terminal 8 in the connector 9. Thus, the tube 23 is not exposed at the upper end of the supporting member 24 adjacent to the connector 9. Because the vacuum injection of the sealing agent 11 is not needed, the bubbles in the sealing agent 11 can be reduced.

As shown in FIG. 2C, the temperature sensor element 21 includes the thermistor 51, an electrode 52, a paste 53, a first coating material 54 and a second coating material 55. The thermistor 51 is a sensor chip for measuring a temperature, and made of metal, e.g., Co, Mn or Ni. The thermistor 51 is electrically connected to the lead 22 through the electrode 52 and the paste 53. The thermistor 51 and a periphery of the thermistor 51 are covered and protected by the first coating material 54 made of glass, in a state that the electrode 52 and the lead 22 are electrically connected. The lead 22 is covered and protected by the protective (insulation) tube 23. The second coating material 55 made of polyamide, for example, covers and protects the lead 22 between the tube 23 and the first coating material 54, in order to reduce corrosion of the lead 22. The lead 22 is connected to the terminal 8 by welding, for example, in the connector 9.

When a pressure is applied to media in the pressure sensor device 1 in a direction of an outline arrow shown in FIG. 1, the pressure is transmitted to the pressure receiving face of the pressure sensor 10 disposed on the case 2 through the pressure introduction passage of the pipe 3. Then, a diaphragm of the pressure sensor 10 is transformed in accordance with the pressure. A diffusion resistor (not shown) has a resistance variation value corresponding to the transformation of the diaphragm. The resistance variation value is output from a bridge circuit as a voltage, and amplified in a signal processor. Thereafter, the amplified result is output into the outside circuit through the terminal 8. Further, the temperature sensor 20 detects a temperature of media adjacent to the temperature sensor element 21. The detected temperature signal is output into the outside circuit through the terminal 8.

Figure 4:
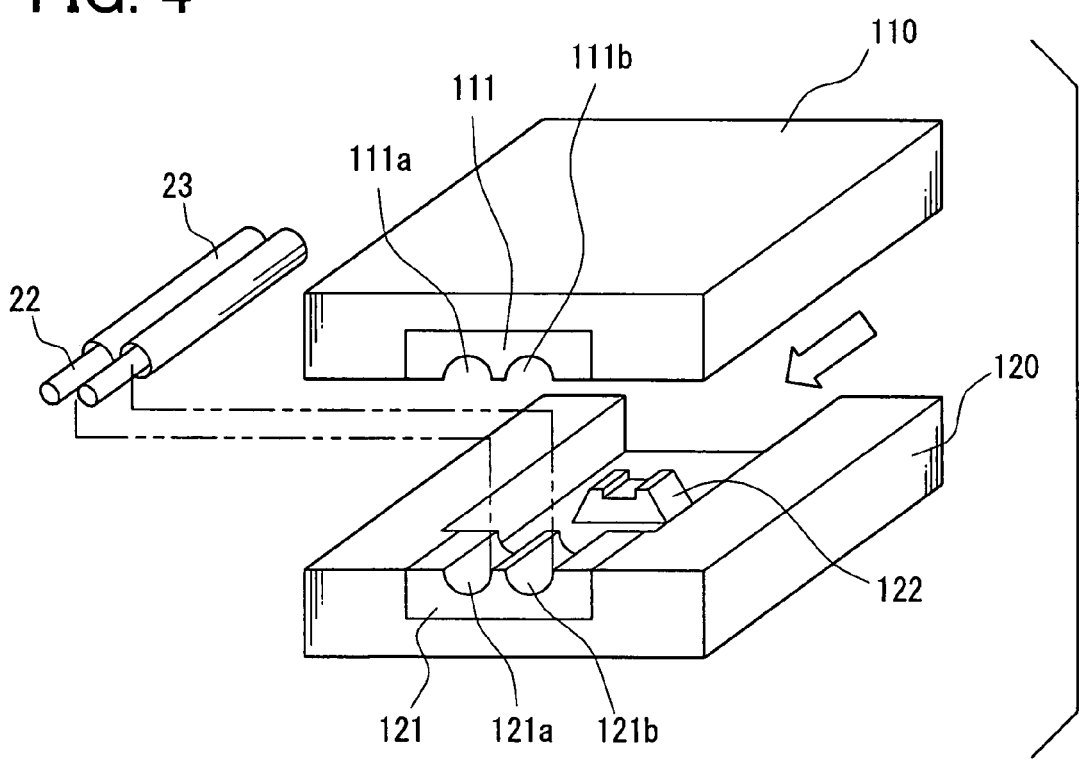
FIG. 4 is a perspective view showing a method of molding the supporting member.
Figure 5A:
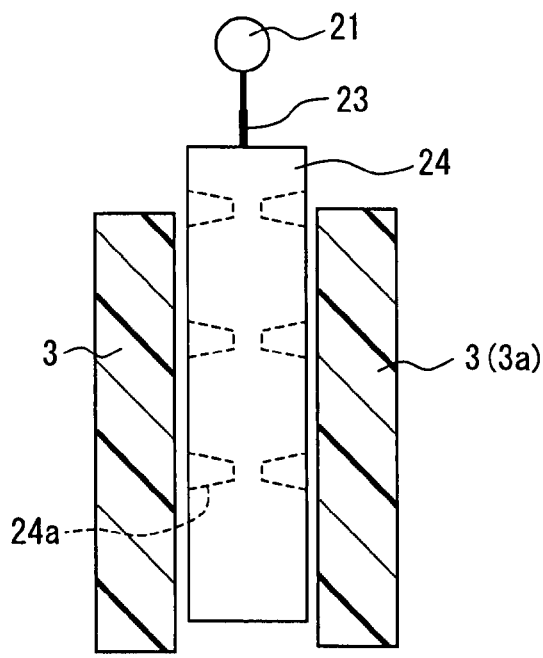
FIG. 5A is a schematic cross-sectional view showing a process for positioning the supporting member.

Next, a method of manufacturing the temperature sensor 20 will be described with reference to FIGS. 4-5C. First, a method of molding the supporting member 24 will be described with reference to FIG. 4. The supporting member 24 is formed by injecting the hot-melt adhesive into a mold including a first mold 110 and a second mold 120. The first mold 110 has a cut preventing portion 111 for preventing the tube 23 from being cut, and lead holders 111a, 111b are provided in the cut preventing portion 111. The second mold 120 has a cut preventing portion 121 for preventing the tube 23 from being cut, and lead holders 121a, 121b are provided in the cut preventing portion 121.

When the supporting member 24 is molded with a comparison mold not having the cut preventing portions 111, 121, a lead covered with a tube is arranged on a positioning jig (lead holder), and a gap between the lead holder and the tube is cleared. However, when the tube is tightened by the comparison mold, the tube may be cut at the lead holder.

In contrast, in this embodiment, the first mold 110 has the cut preventing portion 111 made of a soft material such as rubber, and the lead holders 111a, 111b are provided in the cut preventing portion 111. The second mold 120 has the cut preventing portion 121 made of the soft material such as rubber, and the lead holders 121a, 121b are provided in the cut preventing portion 121.

In order to mold the supporting member 24, the lead 22 covered with the tube 23 is arranged on the lead holders 111a, 111b, 121a, 121b, and the lead 22 is arranged on the positioning jig 122. Then, the hot-melt adhesive is injected and molded in a cavity between the first mold 110 and the second mold 120 in the hot-melt adhesive injection process.

Due to the hot-melt adhesive injection process, the hot-melt adhesive can be injected into the cavity of the mold with a low injection pressure. At this time, the hot-melt adhesive is melted and has a low viscosity. An ordinary injection process has an injection pressure of about 1000 kg/cm$^2$. In contrast, the hot-melt adhesive injection process in this embodiment has the injection pressure of about 10 kg/cm$^2$. Therefore, stress applied to the lead 22 can be reduced when the hot-melt adhesive is injected into the cavity of this mold. Thus, the lead 22 is not broken or bent, while the lead 22 is thin. Even if a gap is provided between the lead holder 111a, 111b, 121a, 12b and the tube 23, the gap can be filled with the hot-melt adhesive in the hot-melt adhesive injection process. Thus, accuracy for molding the supporting member 24 can be improved. Further, the hot-melt adhesive injection process may be easily automated.

Next, a method of mechanically connecting the temperature sensor 20 to the pipe 3 will be described. As shown in FIG. 5A, the lead 22 is covered with the supporting member 24, and the supporting member 24 is positioned to be protruded from an end of an opening of the pipe 3. The opening of the pipe 3 is made between the pipe 3 and the separation board 3a of the pipe 3. At this time, a clearance necessary for assembling the supporting member 24 and the pipe 3 is provided between the supporting member 24 and the pipe 3.

Figure 5B:
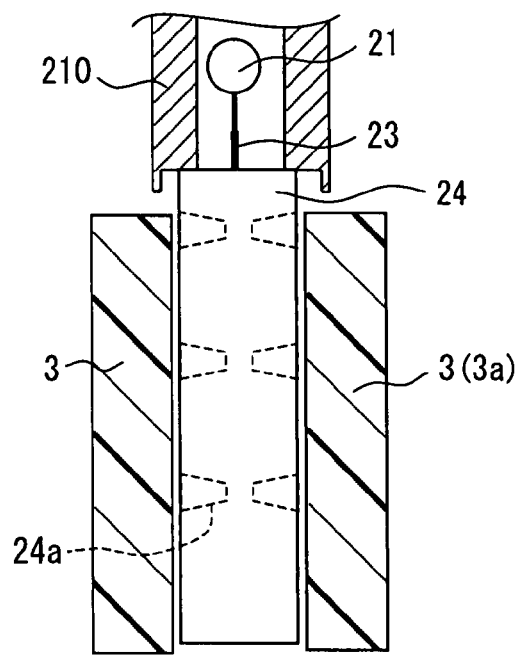
FIG. 5B is a schematic cross-sectional view showing a process for arranging a heat pin.
Figure 5C:
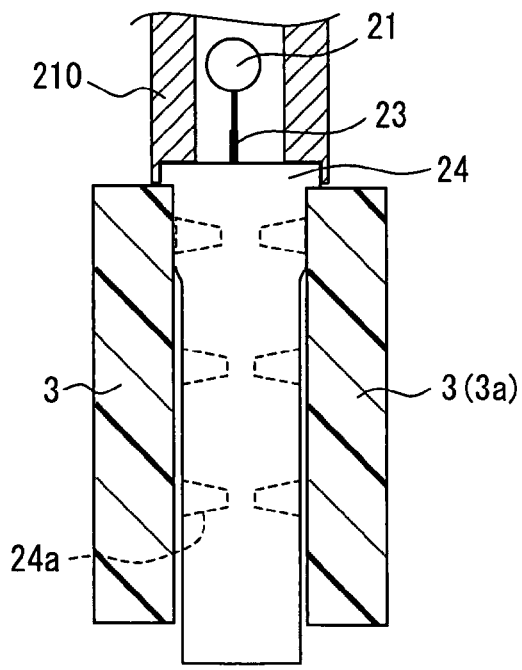
FIG. 5C is a schematic cross-sectional view showing a process for pressing the supporting member.

Then, as shown in FIG. 5B, a heat pin 210 is arranged on the supporting member 24 protruding from the end of the opening of the pipe 3 so as to correspond to a position of the opening of the pipe 3. Then, as shown in FIG. 5C, the supporting member 24 is pressed into the opening of the pipe 3 and heated.

Because the supporting member 24 is made of the hot-melt adhesive, the heat pin 210 can easily transform the supporting member 24. Thus, when the supporting member 24 is pressed and heated, the transformed hot-melt adhesive (supporting member 24) can be in an intimate contact with the pipe 3. Thus, the temperature sensor 20 is mechanically connected to the pipe 3. Therefore, the temperature sensor element 21 can be solidly supported by the supporting member 24.

Figure 5D:
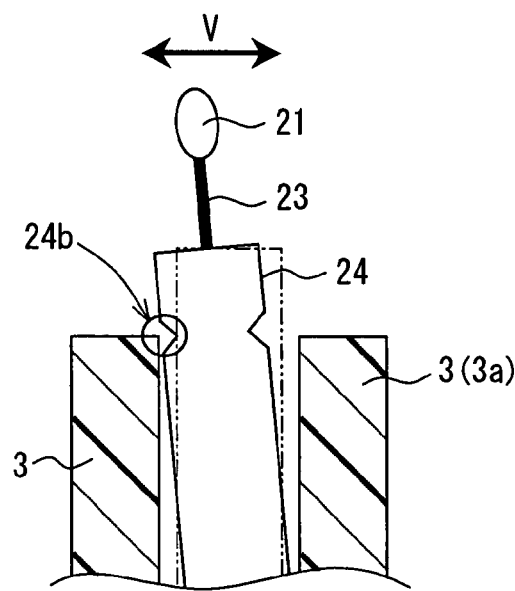
FIG. 5D is a schematic cross-sectional view showing a displacement of the supporting member in a comparison example.

For example, if the clearance necessary for assembling the supporting member 24 and the pipe 3 is left in an comparison example, as shown in FIG. 5D, the supporting member 24 may be displaced by a vibration V having acceleration surpassing a strength of the supporting member 24. Then, the pipe 3 and the supporting member 24 may interfere with each other, and a wear 24b may be generated in the supporting member 24. However, in this embodiment, the clearance necessary for assembling the supporting member 24 and the pipe 3 is not left, after the supporting member 24 is pressed into the opening of the pipe 3. Therefore, the temperature sensor element 21 can be solidly supported by the supporting member 24.

In this embodiment, the supporting member 24 is mechanically pressed into the opening of the pipe 3. Alternatively, the supporting member 24 may be mechanically connected to the case 2 by pressing and heating. That is, the supporting member 24 is mechanically connected at least one of the case 2 and the pipe 3.

Figure 6:
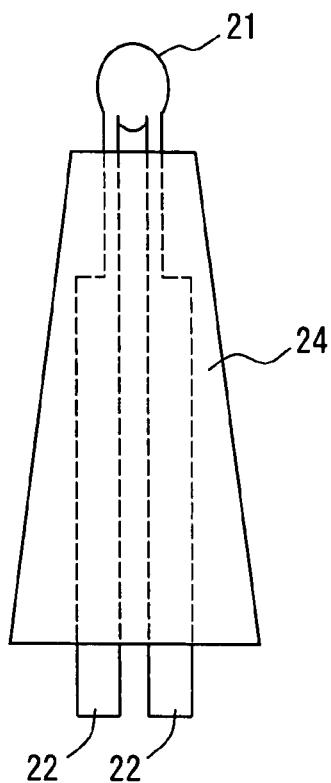
FIG. 6 is a schematic side view showing shapes of the lead and the supporting member.

The supporting member 24 has a straight shape in this embodiment. Alternatively, as shown in FIG. 6, the supporting member 24 is made gradually thinner toward the temperature sensor element 21. Thereby, a thermal mass absorbing and holding heat can be easily reduced. That is, heat can be easily radiated in adjacency of the temperature sensor element 21. Thus, the response performance of the temperature sensor 20 can be improved.

Further, the lead 22 may have a first thickness (shape) in adjacency of the temperature sensor element 21 and a second thickness (shape) in adjacency of the terminal 8. The first shape is thinner (smaller) than the second shape. Thus, the response performance of the temperature sensor 20 can be improved, because the thermal mass can be easily reduced in adjacency of the temperature sensor element 21.

Figure 7:
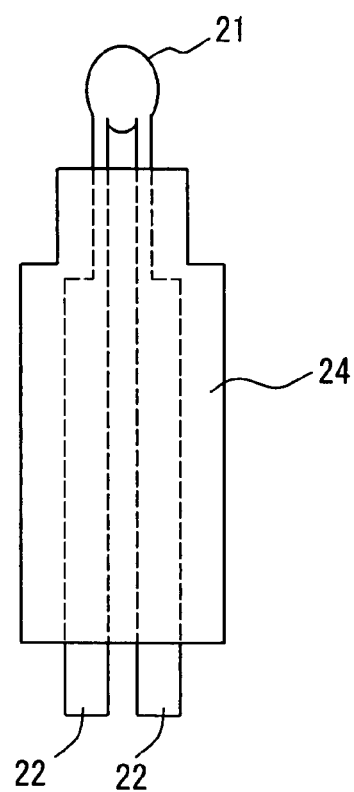
FIG. 7 is a schematic side view showing another shape of the supporting member.

Further, as shown in FIG. 7, the supporting member 24 may have a first thickness (shape) in adjacency of the temperature sensor element 21 and a second thickness (shape) in adjacency of the terminal 8. The first shape is thinner (smaller) than the second shape. Thus, the response performance of the temperature sensor 20 can be improved, because the thermal mass can be easily reduced in adjacency of the temperature sensor element 21.

Such changes and modifications are to be understood as being within the scope of the present invention as defined by the appended claims.

What is claimed is:

1. A method of manufacturing a temperature sensor, the method comprising:
    arranging a lead inserted into a tube on a mold, wherein the lead electrically connects a temperature sensor element and a terminal, which is located to be electrically connected to an outside circuit; and
    injecting a hot-melt adhesive into the mold so as to form a supporting member for covering the lead inserted into the tube, and supporting the temperature sensor element.

2. The method according to claim 1, further comprising:
positioning the supporting member to be protruded from an end of an opening of a second member for accommodating at least a part of the supporting member, wherein the second member is connected to a first member for accommodating the terminal; and
connecting the supporting member to the second member by pressing and heating.

3. The method according to claim 1, further comprising:
mechanically connecting the supporting member to a first member for accommodating the terminal, wherein the first member is connected to a second member for accommodating at least a part of the supporting member.

4. The method according to claim 1, further comprising:
connecting the supporting member to a first member for accommodating the terminal;
assembling the first member and a second member for accommodating at least a part of the supporting member; and
connecting the supporting member to the second member by pressing and heating.

5. The method according to claim 1, further comprising:
connecting the supporting member to at least one of a first member for accommodating the terminal and a second member for accommodating at least a part of the supporting member, wherein
the connecting includes transforming at least a part of the supporting member and making the supporting member in contact with at least one of the first member and the second member.

6. The method according to claim 1, wherein
the mold includes a positioning jig for positioning the lead, and
the arranging is performed by using the positioning jig.

7. The method according to claim 1, further comprising:
arranging the supporting member made of the hot-melt adhesive in a housing, wherein
the housing accommodates the terminal connected to the temperature sensor element through the lead.

8. The method according to claim 7, further comprising:
connecting the supporting member to a part of the housing.

9. The method according to claim 1, further comprising:
removing the supporting member made of the hot-melt adhesive from the mold; and
arranging the supporting member made of the hot-melt adhesive in a housing, wherein
the housing accommodates the terminal connected to the temperature sensor element through the lead.

10. The method according to claim 9, further comprising:
connecting the supporting member to a part of the housing.

* * * * *